United States Patent [19]

Appeldorn

[11] Patent Number: 4,875,259
[45] Date of Patent: Oct. 24, 1989

[54] INTERMESHABLE ARTICLE

[75] Inventor: Roger H. Appeldorn, White Bear Lake, Minn.

[73] Assignee: Minnesota Mining and Manufacturing Company, St. Paul, Minn.

[21] Appl. No.: 172,631

[22] Filed: Mar. 24, 1988

Related U.S. Application Data

[63] Continuation of Ser. No. 904,358, Sep. 8, 1986, abandoned.

[51] Int. Cl.$^4$ .............................................. A44B 1/00
[52] U.S. Cl. .................................... 24/576; 24/575; 24/578
[58] Field of Search ................. 24/575, 576, 577, 578

[56] References Cited

U.S. PATENT DOCUMENTS

| | | | |
|---|---|---|---|
| 281,760 | 7/1883 | Gingras . | |
| 595,510 | 12/1897 | Adams . | |
| 983,093 | 1/1911 | Svenson | 24/575 X |
| 1,212,262 | 1/1917 | Rockwell . | |
| 1,214,261 | 6/1917 | Balbach . | |
| 1,342,979 | 6/1920 | Beitner . | |
| 1,887,913 | 11/1932 | Bell . | |
| 1,954,242 | 4/1934 | Heppenstall | 20/92 |
| 1,988,868 | 5/1933 | Snyder | 287/105 |
| 2,144,755 | 1/1939 | Freedman | 26/281 |
| 2,206,223 | 7/1940 | Dearborn | 24/575 X |
| 2,435,183 | 1/1948 | Pezzella | 24/575 X |
| 2,461,201 | 2/1949 | Ellis | 24/575 X |
| 2,487,400 | 11/1941 | Tupper | 150/0.5 |
| 2,499,898 | 3/1950 | Anderson | 24/206 |
| 2,558,367 | 6/1951 | Madsen | 24/261 |
| 2,632,894 | 3/1953 | Louis | 2/320 |
| 2,717,437 | 9/1955 | de Mestrral | 28/72 |
| 2,780,261 | 2/1957 | Svec et al. | 150/3 |
| 2,879,018 | 3/1959 | Pence | 24/575 X |
| 2,895,753 | 7/1959 | Fentiman | 287/20.3 |
| 2,926,409 | 3/1960 | Perry | 24/217 |
| 3,000,658 | 9/1961 | Sprouse | 287/103 |
| 3,009,235 | 11/1961 | de Mestral | 28/78 |
| 3,039,340 | 6/1962 | Livermont | 81/177 |
| 3,054,434 | 9/1962 | Ausnit et al. | 150/3 |
| 3,101,517 | 8/1963 | Fox et al. | 24/204 |
| 3,108,924 | 10/1963 | Adie | 161/127 |
| 3,173,184 | 3/1965 | Ausnit | 24/281 |
| 3,182,345 | 5/1965 | Smith | 15/176 |
| 3,192,589 | 7/1965 | Pearson | 24/204 |

(List continued on next page.)

FOREIGN PATENT DOCUMENTS 1807993.1 11/1970 Fed. Rep. of Germany .
2352676 10/1973 Fed. Rep. of Germany .
2127344A 4/1964 United Kingdom .

OTHER PUBLICATIONS

*The Tupperware Collection*, vol. 1, No. 1, Summer 1986, twenty-eight pages.
*Polytyechna* entitled "Self-Locking Flat Clamping Tape," One page.

Primary Examiner—Laurie K. Cranmer
Attorney, Agent, or Firm—Donald M. Sell; Walter N. Kirn; Leland D. Schultz

[57] ABSTRACT

An intermeshable article useful for a multitude of purposes such as fastening, closing, coupling and connecting, to name but a few. The article includes a member which has at least one major surface which is a structured surface. The structured surface is made up of a plurality of elements. Each element has at least one side inclined relative to the plane of the member at an angle sufficient to form a taper. Thus, each element may mesh with at least one corresponding element when brought into contact therewith and adhere thereto at least partially because of the frictional force of adherence of the contacting sides. The corresponding element may be the article itself, another similar article or a dissimilar article, such as for example a container having a correspondingly shaped structured surface. In the preferred embodiment, the elements are arranged side by side to form a plurality of linear ridges and grooves whereby the sides of adjacent elements form the sides of each groove.

23 Claims, 4 Drawing Sheets

U.S. PATENT DOCUMENTS

| | | | |
|---|---|---|---|
| 3,198,228 | 8/1965 | Naito | 150/3 |
| 3,263,292 | 8/1966 | Fekete | 24/206 |
| 3,266,113 | 8/1966 | Flanagan, Jr. | 24/204 |
| 3,335,774 | 8/1967 | Reed | 150/5 |
| 3,369,265 | 2/1968 | Holberstadt et al. | 15/22 |
| 3,408,705 | 11/1968 | Kayser et al. | 24/204 |
| 3,545,048 | 12/1970 | Daddona, Jr. et al. | 24/213 |
| 3,577,105 | 4/1971 | Jones, Jr. | 333/95 |
| 3,604,145 | 9/1971 | Zimmerman | 24/578 X |
| 3,618,802 | 11/1971 | Yates, Jr. | 215/41 |
| 3,633,642 | 1/1972 | Siegel | 150/3 |
| 3,689,346 | 9/1972 | Rowland | 156/245 |
| 3,730,382 | 5/1973 | Heisler | 220/60 |
| 3,742,663 | 7/1973 | Duskin | 52/145 |
| 3,780,469 | 12/1973 | Hancovsky | 46/25 |
| 3,869,764 | 3/1975 | Umezu | 24/204 |
| 3,899,805 | 8/1975 | McMillan | 24/575 |
| 3,905,174 | 9/1975 | Heisler | 53/38 |
| 3,955,245 | 5/1976 | Ballin | 24/577 |
| 4,060,089 | 11/1977 | Nolles | 128/325 |
| 4,093,009 | 6/1978 | Inverene et al. | |
| 4,244,683 | 1/1987 | Rowland | 425/143 |
| 4,330,590 | 5/1982 | Vesley | 428/336 |
| 4,403,692 | 9/1983 | Pollacco | 206/223 |
| 4,452,356 | 6/1984 | Dahl | 206/45.32 |
| 4,520,943 | 6/1985 | Nielsen et al. | 220/281 |
| 4,533,042 | 8/1985 | Pollacco | 206/223 |
| 4,581,792 | 4/1986 | Spier | 24/575 |

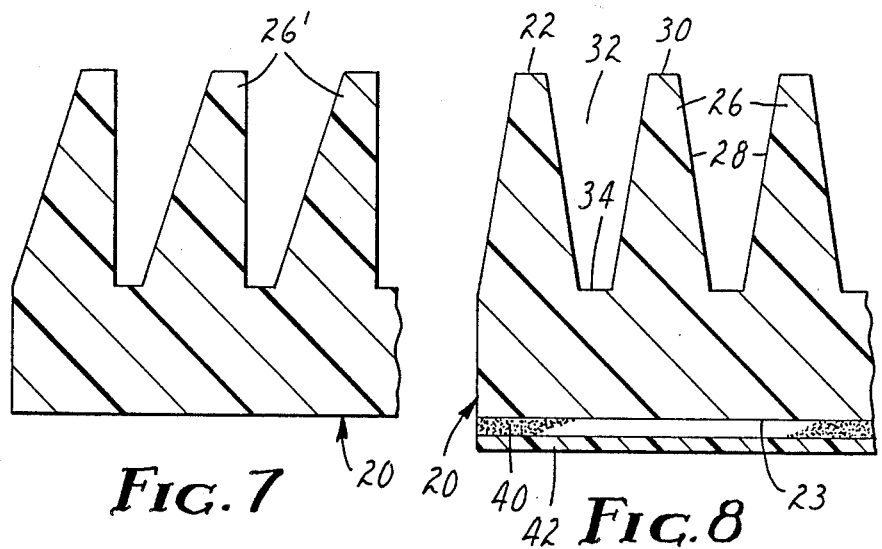
Fig. 7
Fig. 8
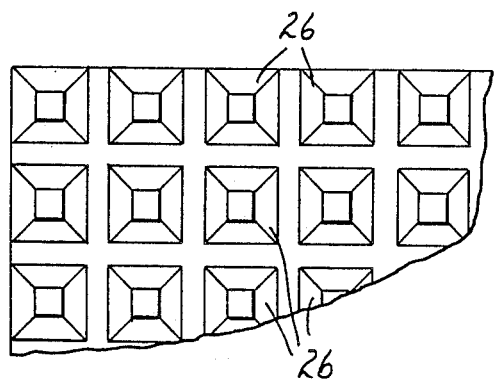
Fig. 9
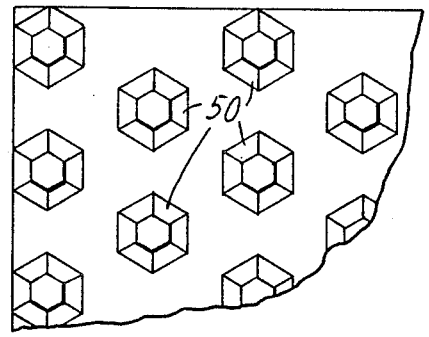
Fig. 10

INTERMESHABLE ARTICLE

This is a continuation of application Ser. No. 904,358 filed Sept. 8, 1986 and now abandoned.

FIELD OF THE INVENTION

The present invention relates to intermeshable articles, and in one aspect to articles having a structured surface on one side. The structured surface of such an article may be brought into contact with itself, another similar article or the structured surface of a dissimilar article for a multitude of purposes, such as, for example, fastening.

BACKGROUND OF THE INVENTION

There are a number of ways known by those skilled in the art to fasten, couple, or connect items. For example, it has been proposed to taper the sides of a shaft so that the head portion consisting of, for example, a toothbrush or tool, may be attached thereto, while permitting removal and interchange of the head portion, as disclosed in U.S. Pat. Nos. 1,887,913 (Bell), 3,039,340 (Livermont), 3,182,345 (Smith) and 3,369,265 (Halberstadt et al). Also, intermeshing joints have been utilized for connecting in woodworking, as disclosed in U.S. Pat. Nos. 1,212,262 (Rockwell), 1,214,261 (Balbach), 1,342,979 (Beitner) and 1,954,242 (Heppenstall), and in metal working, as disclosed in U.S. Pat. Nos. 2,895,753 (Fentiman) and 3,000,658 (Sprouse). Further, inclined or tapered shafts have been utilized for interconnecting the ends of leather washers, as illustrated in U.S. Pat. No. 281,760 (Gingras). However, all of the above have utilized a single shaft and, in some instances, either provided protruding elements along the sides or a T-shaped like-end to provide additional mechanical interference to enhance fastening.

In addition, several fasteners have been disclosed in the art for attaching items together. For example, loops and hooks have been utilized whereby when the hooks are brought into contact with the loops the former interlocks with the latter, as disclosed in U.S. Pat. Nos. 2,717,437 (Mestra) and 3,009,235 (Mestra). Also, a plurality of macro asperities or protrusions have been utilized which may either be brought into contact with similarly shaped macro asperities or with correspondingly shaped recesses, as disclosed in U.S. Pat. Nos. 2,499,898 (Anderson), 3,192,589 (Pearson), 3,266,113 (Flanagan, Jr.), 3,408,705 (Kayser et al.), and 4,520,943 (Nielsen). In addition, fasteners utilizing a plurality of longitudinally extending rib and groove elements which deform and mechanically interfere and resiliently interlock with each other have been disclosed, for example, in U.S. Pat. Nos. 2,144,755 (Freedman), 2,558,367 (Madsen), 2,780,261 (Svec et al.), 3,054,434 (Ausnit et al.), 3,173,184 (Ausnit), 3,198,228 (Naito) and 3,633,642 (Siegel).

Further, containers of the type commonly known as "Tupperware" containers (Tupperware is a registered trademark of Kraft, Inc.) and the many similar containers are disclosed, for example, in U.S. Pat. Nos. 2,487,400 (Tupper), 3,335,774 (Reed), 3,618,802 (Yates, Jr.), 3,730,382 (Heisler), and 3,817,420 (Heisler). The covers of such containers are precisely sized and when mounted, the covers are stretched to cause a tension to be developed in the cover rims between inner and outer retaining lip portions to provide mechanical interlocking for closure.

SUMMARY OF THE INVENTION

In contrast to the ways of fastening, closing, coupling and connecting of the prior art acknowledged above, the article of the present invention provides a way of adhering the article to itself, another similar article or the structured surface of a dissimilar article at least partially because of the frictional force of adherence of the material of the adhering items. In addition, because adherence is related to friction, no macro deformation or mechanical interference is required.

The intermeshable article of the present invention includes a member which has at least one major surface and at least a portion of that surface is a structured surface. The structured surface is made up of a plurality of tapered elements. Each element has at least one side inclined relative to the plane of the member at an angle sufficient to form a taper such that each element will mesh with at least one corresponding element when brought into contact with the corresponding element and adhere thereto at least partially because of the frictional force of adherence of the contacting sides.

There are a multitude of potential uses for the above described intermeshable article where it may be desirable to bring the structured surface of the article into contact with itself, another similar article or the structured surface of a dissimilar article for fastening, closing, coupling and connecting, to name but a few.

BRIEF DESCRIPTION OF THE DRAWINGS

The present invention will be more fully described with reference to the accompanying drawings wherein like reference numerals identify corresponding components, and:

FIGS. 7 and 8 are cross-sectional views of alternate embodiments of the article of the present invention; and FIGS. 9 and 10 are plan views of alternate embodiments of the article of the present invention.

DETAILED DESCRIPTION OF THE PREFERRED EMBODIMENT

Figure 1:
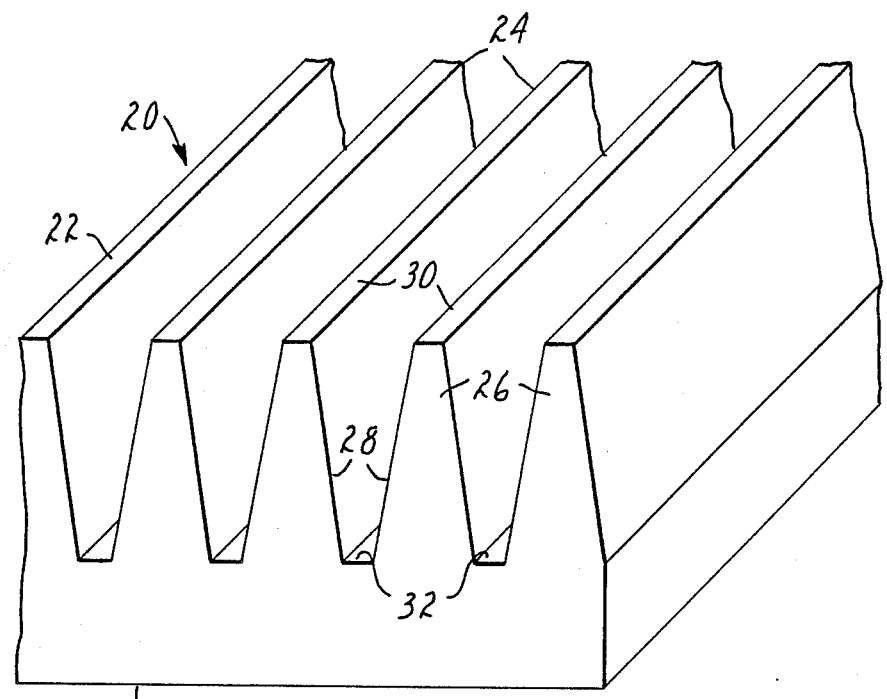
FIG. 1 an enlarged perspective view of the intermeshable article of the present invention.

Referring to FIG. 1 of the drawings, an intermeshable article of the present invention, generally designated 20, is illustrated. The article includes a member which has two major surfaces 22 and 23, and at least one of which is a structured surface 24. The structured surface includes a plurality of tapered elements 26, and each element has at least one side 28. In the illustrated article 20, the elements 26 each have two sides and are arranged side by side to form a plurality of linear ridges 30 and grooves 32.

Figure 4:
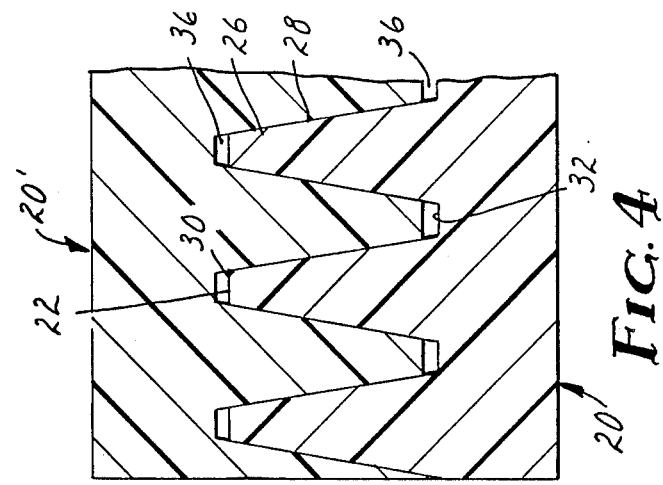
FIGS. 2, 3, and 4 are cross-sectional views of the article illustrated in FIG. 1 showing a progression of two similar articles being brought into contact with one another.
Figure 3:
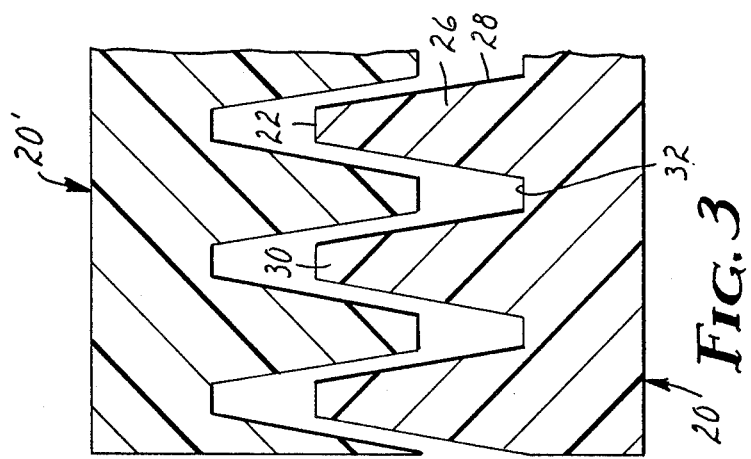
Figure 2:
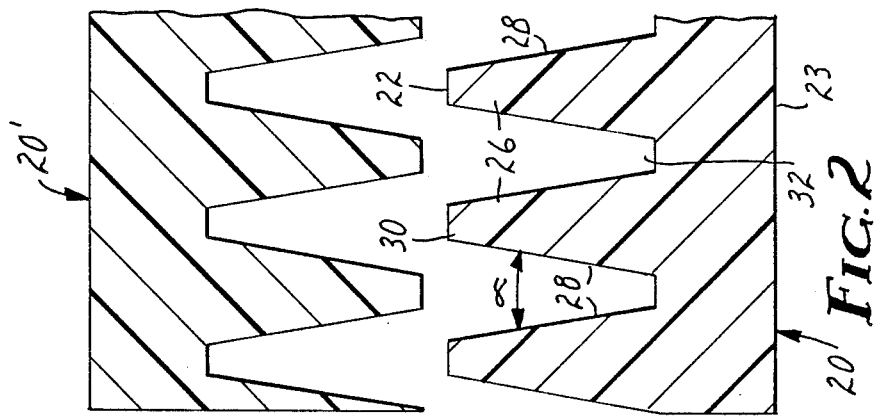

The sides 28 of each element are inclined relative to the plane of the article at an angle sufficient to form a taper such that each element will mesh with at least one corresponding element of, for example, another similar article 20', as illustrated in FIGS. 2, 3 and 4. Then when they are brought into contact with one another, the elements will adhere to one another, at least partially, because of the frictional force of adherence of the contacting sides without macro deformation, or mechanical interference or interlocking of the elements being required. However, it is believed that deformation of any surface irregularities or random micro asperities does take place, but only on a microscopic scale which contributes to adherence by increasing the amount of actual area contact between the surfaces. Thus, it is preferred that the contacting surfaces be optically smooth to decrease macro deformation and to increase adherence for some applications.

Figures 5, 6:
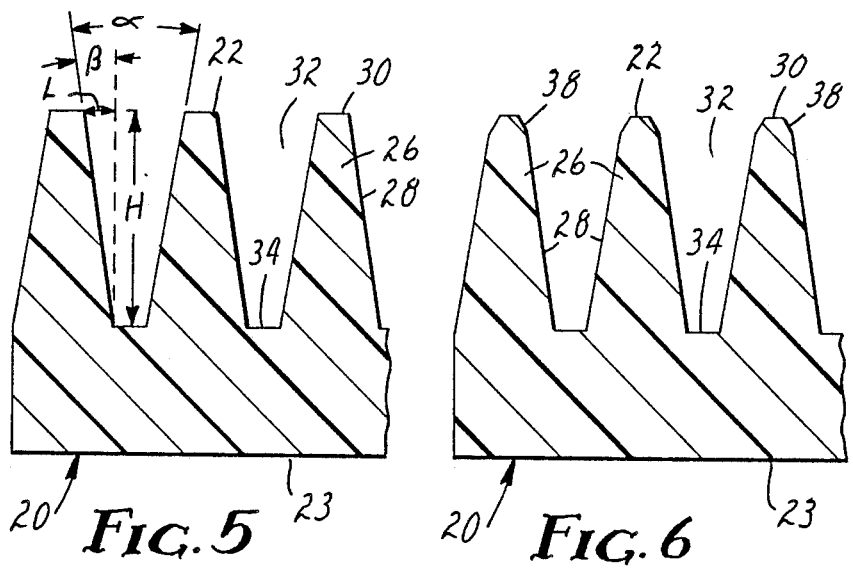
FIG. 5 is an enlarged cross-sectional view of the elements of the article of the present invention depicted in FIG. 1.
FIG. 6 is an enlarged cross-sectional view illustrating a variation of the elements of the present invention.

With reference to FIG. 5, it has been observed that when the tangent of the half angle $\beta$ is approximately equal to or less than the coefficient of friction $\mu$ of the material of the contacting sides, adherence between the two articles 20 and 20' is substantially increased. Thus, one can utilize the relationship between the coefficient of friction $\mu$ and the total included angle $\alpha$ in designing articles by the following equations:

$$\mu = \frac{L}{H} \tag{1}$$

$$\mu = \tan\frac{\alpha}{2} \tag{2}$$

$$\alpha = 2 \arctan \mu \tag{3}$$

where $\beta = \alpha/2$ and the slope of the taper $= L/H$.

In the preferred embodiment, as illustrated in FIG. 1 and in greater detail in FIG. 5, each groove 32 is provided with a trough 34 which separates adjacent elements. Also, each element 26 is sized such that when the elements are brought into contact with one another to mesh, they will contact each other only along the sides of elements. This provides a cavity 36, as illustrated in FIG. 4, and facilitates adherence, the degree of which may vary depending upon the angle of the taper and/or the frictional forces associated with the sides of the intermeshing elements. The cavity 36 insures side contact. Each ridge 30 and trough 34 can touch (not shown) as long as the force associated therewith is not greater than the force associated with the sides 28. To facilitate alignment of the elements 26, each ridge may include a portion which may be curved or inclined to form, for example, a chamfered portion 38 as illustrated in FIG. 6.

In addition, as illustrated in FIG. 7, the elements 26' may be canted with respect to the perpendicular axis of each element relative to the plane of the article to provide directionability of adherence and repositionability.

Figure 11:
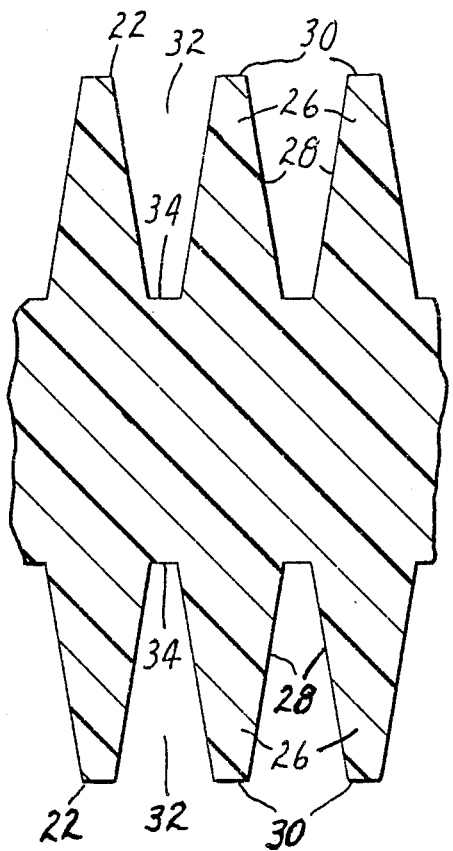
FIG. 11 is a cross-sectional view of an alternative embodiment of the present invention.

It should be appreciated that the present invention should not be limited to rows of two sided elements arranged side by side, but may include a number of configured elements such as circular or polygonal as long as each has at least one side as, for example, illustrated in FIGS. 9 and 10 which may be used for adherence. In FIG. 9, rows of four sided elements 26 are arranged so that they may mesh with corresponding elements when brought into contact therewith. Also, as illustrated in FIG. 10, a plurality of six sided elements 50 may be arranged adjacent one another. Alternatively, the elements of one article may be positive elements and the elements of the other article may be negative elements so that the positive elements may mesh with the negative elements to adhere thereto. Also, as shown in FIG. 11, both major surfaces of the article may be structured surfaces and include tapered elements 26.

The particular material used for the article 20 may vary and is not essential to the present invention. Thus, ceramics, glasses, polymers and metals, for example, may be useful. However, polymeric materials, such as commercially available acrylics, vinyls, polyethylenes and polycarbonates, have been found to be useful. Normally, the manufacturers of this product will select the best commercially available material based upon price, application and manufacturing process. In addition, for specialty applications, materials which are biodegradable, conductive or magnetic may also be useful.

There are several ways to mass produce the articles 20 of the present invention which are well known to those skilled in the art, for example, as illustrated in U.S. Pat. Nos. 3,689,346 (Rowland), 4,244,683 (Rowland), 4,576,850 (Martens) and U.K. Patent Application No. GB 2,127,344 A (Pricone et al.), the disclosures of which are hereby incorporated by reference. The particular manufacturing process is not essential to the present invention, and is a matter of choice based upon economics and availability. Presently, prototypes have been made by compression molding sheets of polymethyl methacrylate (PMMA), polyvinyl chloride (PVC) and polyethylene.

The thickness of the article 20 may vary depending upon the particular application, such as a fastener. Thus, the article 20, for some applications, may be formed of a thin, flexible sheet or film so that it can be flexed to allow separation and repositioning of the article.

APPLICATION AND USE

There are a multitude of potential uses for the article 20 of the present invention, the most promising of which, due to its ability to mesh and releasably adhere, is as a fastener for such things as, for example, reclosable bags, tapes, and closures, to name but a few. In addition, the structured surface of the article 20 may be brought into contact with itself, another similar article 20 or the corresponding structured surface of a dissimilar article or item, such as a container.

As illustrated in FIG. 8, to facilitate placement of such an article a suitable means for mounting the article, such as a coating 40 of an adhesive composition, may be placed on one side 23 of the article. The particular adhesive is not essential to the present invention and may include, for example, ultraviolet curable adhesives of the type disclosed in U.S. Pat. No. 4,330,590 (Vesley), the disclosure of which is hereby incorporated by reference. To protect the coating 40, a protective film 42 may be bonded thereto. It is preferred that the film 42 have a release surface to permit it later to be peeled away to expose the adhesive coating so that the article 20 may then be adhered to items. Useful films include, for example, polycarbonate, polymethyl methacrylate, polystyrene, and biaxially-oriented polyethylene terephthalate. In addition, paper or other nonwoven films having a suitable release coating may be used.

Objects and advantages of the invention are further illustrated by the following examples, but the particular material recited in these examples, as well as other conditions and details, should not be construed to unduly limit this invention.

EXAMPLE 1

Two pieces of intermeshable articles 20, of the type illustrated in FIG. 5, were tested for tensile strength and peel strength. Both pieces were of polyvinyl chloride (PVC) having 50 elements per centimeter.

EXAMPLE 2

Two pieces of intermeshable articles 20, of the type illustrated in FIG. 6, were tested for tensile strength and peel strength. Both pieces were of polyvinyl chloride (PVC) having 50 elements per centimeter.

A 10 pound peel tester was used to test various samples from Example 1 and Example 2. The results revealed that more tensile force was needed to break the bond when pulled axially with respect to the grooves. Also, repeatedly separating the grooved material appeared to have no effect on either the tensile or peel strength of the material.

While a preferred embodiment of the present invention has been described so as to enable one skilled in the art to practice the techniques of the present invention, the preceding description is intended to be exemplary and should not be used to limit the scope of the invention. The scope of the invention should be determined only by reference to the following claims.

What is claimed is:

1. An intermeshable article, comprising
   a member having at least one major surface at least a portion of that surface being a structured surface;
   said structure surface including a plurality of solid tapered elements, each element having at least one side inclined relative to a common plane at an angle sufficient to form a taper such that each element may mesh with at least one corresponding element when brought into contact with said corresponding element and adhere thereto at least partially because of the frictional force of adherence of said contacting sides and wherein the tangent of the half angle of the tapered sides of the elements is no greater than the coefficient of friction of the material of the contacting surfaces.

2. The article defined in claim 1, wherein each element has two sides, and said plurality of elements are arranged side by side to form a plurality of linear ridges and grooves, whereby the sides of adjacent elements form the sides of each groove and the sides of each element meet at each ridge.

3. The article defined in claim 2, wherein each groove further comprises a trough between adjacent elements separating the sides of each groove to provide a cavity when said elements are brought into contact with one another.

4. The article defined in claim 1, wherein said corresponding element is another element of said member.

5. The article defined in claim 1, wherein said member is a sheet of a polymeric material.

6. The article defined in claim 1, further comprising at least one coating of an adhesive composition being on a second major surface of the member opposite said structured surface.

7. The article defined in claim 6, further comprising a protective film being in contact with said coating of adhesive composition.

8. The article defined in claim 7, wherein said protective film includes a release surface in contact with said coating of adhesive composition which permits said protective film to be peeled from said adhesive coating.

9. Intermeshable articles, comprising:
   a first member having at least one major surface and at least a portion of said major surface being a structured surface;
   a second member having at least one major surface and at least a portion said major surface being a structure surface; and
   said structured surfaces of said first member and said second member each including a plurality of solid tapered elements, each element having at least one side inclined relative to a common plane in each of said members at an angle sufficient to form a taper so that said element of said first member may mesh with said elements of said second member when brought into contact with one another and said first member may adhere to said second member at least partially because of the frictional force of adherence of said contacting sides of said elements of said first member and said elements of said second member and wherein the tangent of the half angle of the tapered sides of the element is no greater than the coefficient of friction of the material of the contacting surfaces.

10. The articles defined in claim 9, wherein the elements of said first member are positive elements and the elements of said second member are negative elements whereby said positive elements may mesh with said negative elements and adhere when brought into contact with one another.

11. The articles defined in claim 9, wherein each element has two sides and said plurality of elements are arranged side by side to form a plurality of linear ridges and grooves, and the sides of adjacent elements form the sides of each groove.

12. The articles defined in claim 11, wherein the frictional force of adherence associated with the sides of the meshing elements is greater than the force of contact between the ridges and troughs.

13. The articles defined in claim 11 wherein each element is nonsymmetric and canted with respect to an axis perpendicular to said plane of said members.

14. The articles defined in claim 11, wherein each groove further comprises a trough between the sides of said grooves to provide a cavity when said elements are brought into contact with one another.

15. The articles defined in claim 9, wherein said ridges of said first member and said second member are truncated.

16. The articles defined in claim 15, wherein said elements of at least one member are chamfered to facilitate alignment of said elements.

17. The articles defined in claim 9, wherein said first and said second members each include a second major surface opposite said at least one major surface and wherein both major surfaces of said first member and said second member are structured surfaces.

18. The articles defined in claim 9, further comprising mounting means associated with a second major surface of at least one of said members opposite said structured surface for mounting said members.

19. The articles defined in claim 9, wherein said first member and said second member are at least partially of a polymeric material.

20. The articles defined in claim 9, wherein said first member and said second member include a magnetic material.

21. The articles defined in claim 9, wherein at least one of said members is polyvinyl chloride.

22. The articles defined in claim 9, wherein at least one of said members is polyethylene.

23. The articles defined in claim 9, wherein said first member and said second member are of a biodegradable material.

* * * * *